United States Patent

[11] 3,601,006

| [72] | Inventor | Gunther Schwerin<br>Fellbach, Germany |
|---|---|---|
| [21] | Appl. No. | 852,337 |
| [22] | Filed | Aug. 22, 1969 |
| [45] | Patented | Aug. 24, 1971 |
| [73] | Assignee | Robert Bosch GmbH<br>Stuttgart, Germany |
| [32] | Priority | Aug. 24, 1968 |
| [33] | | Germany |
| [31] | | P 17 51 959.4 |

[54] FLUID-PRESSURE-TRANSMITTING CONTROL ASSEMBLY
12 Claims, 2 Drawing Figs.

[52] U.S. Cl. .............................................. 91/1,
73/419, 92/5, 92/62, 235/201 ME
[51] Int. Cl. .............................................. B23f 1/00
[50] Field of Search .......................................... 92/62, 75,
86, 5; 91/1, 167; 73/419; 235/201 ME

[56] References Cited
UNITED STATES PATENTS

| 2,197,867 | 4/1940 | Klement | 91/167 |
|---|---|---|---|
| 2,327,210 | 8/1943 | Overbeke et al. | 91/1 X |
| 2,630,786 | 3/1953 | Poore | 91/167 |
| 2,948,264 | 8/1960 | Freeman | 91/167 |
| 2,969,042 | 1/1961 | Litl et al. | 235/201 X |
| 3,198,014 | 8/1965 | Corry | 73/419 |
| 3,238,849 | 3/1966 | Brandstadter | 91/167 |
| 3,306,539 | 2/1967 | Grimland | 235/201 |

FOREIGN PATENTS

| 631,803 | 5/1963 | Belgium | 235/201 |

*Primary Examiner*—Martin P. Schwadron
*Assistant Examiner*—Leslie J. Payne
*Attorney*—Michael S. Striker ABSTRACT: A control assembly which can adjust a regulator, gage, switch, potentiometer or another output device as a function of changes in fluid pressure comprises a housing whose chamber accommodates a row of coaxial plungers defining with the housing a series of compartments each communicating with a fluid-operated cylinder and piston unit wherein the pressure of fluid varies. The positions of plungers with reference to each other and with reference to the housing are indicative of fluid pressure in that compartment wherein the pressure is highest whereby a diaphragm, a lever or a like element directly or indirectly detects such positions of the plungers and adjusts the output device as a function of the highest fluid pressure.

Patented Aug. 24, 1971

3,601,006

INVENTOR
Gunther SCHWERIN
By his ATTORNEY

FLUID-PRESSURE-TRANSMITTING CONTROL ASSEMBLY

BACKGROUND OF THE INVENTION

The present invention relates to hydraulic or pneumatic systems in general, and more particularly to improvements in control assemblies which can be used in a hydraulic or pneumatic system to adjust a gage, regulator, switch, potentiometer and/or another output device in accordance with changes in fluid pressure. Still more particularly, the invention relates to improvements in hydraulic or pneumatic systems wherein two or more fluid-operated motors or analogous consuming units maintain the fluid at a variable pressure and wherein an indicator, regulator and/or testing device must be adjusted in dependency on the fluid pressure in that consuming unit wherein the pressure is highest.

It is already known to provide a hydraulic or pneumatic system with a control assembly which produces signals or transmits motion as a function of the sum of or difference between two or more fluid pressures. Such control assemblies cannot be used in systems wherein one or more devices must be adjusted or actuated in dependency on the highest of two or more fluid pressures, i.e., wherein the control assembly must be capable of discriminating between several pressures and of generating signals and/or transmitting motion in dependency on the highest momentarily prevailing pressure.

SUMMARY OF THE INVENTION

An object of the invention is to provide a control assembly which can be utilized in a hydraulic or pneumatic system wherein the fluid pressure in two or more fluid-operated consuming units varies within a known or unknown range and wherein a testing instrument, a regulator, an indicator or an analogous output device must be adjusted, started, arrested or otherwise controlled in dependency on fluid pressure in that consuming unit wherein the pressure is highest.

Another object of the invention is to provide a control assembly which can discriminate between two or more fluid pressures and is capable of generating signals or producing motion as a function of the detected maximum fluid pressure.

A further object of the invention is to provide a control assembly which can be used in connection with existing fluid-operated consuming units, such as hydraulic or pneumatic motors or the like.

An additional object of the instant invention is to provide a control assembly which is of compact design, which comprises a small number of simple parts, and which can be used to control one or more output devices in dependency on fluid pressure in either one of two or more consuming units.

The invention is embodied in a control assembly which is utilized in a hydraulic or pneumatic system having several fluid-operated consuming units which maintain the fluid at different pressures and at least one output device which requires adjustment as a function of fluid pressure in one of the consuming units, e.g., a gage which indicates fluid pressure in that consuming unit wherein the fluid pressure is highest, a regulator which controls the admission of fluid to the consuming units in dependency on pressure in the unit wherein the fluid pressure is highest, and/or an electrical output unit which must be adjusted as a function of maximum fluid pressure. The control assembly comprises housing means having a preferably cylindrical chamber, control means including one plunger or two or more coaxial plungers movably accommodated in the chamber and defining with the housing means a plurality of compartments each in communication with one of the consuming units so that the positions of the plunger or plungers with reference to each other and with reference to the housing means are a function of fluid pressure in that consuming unit wherein the fluid pressure is highest, and an operative connection provided between one of the aforementioned means (i.e., housing means or control means) and the output device and operative to adjust the latter as a function of the positions of the plunger or plungers.

The novel features which are considered as characteristic of the invention are set forth in particular in the appended claims.

The improved control assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
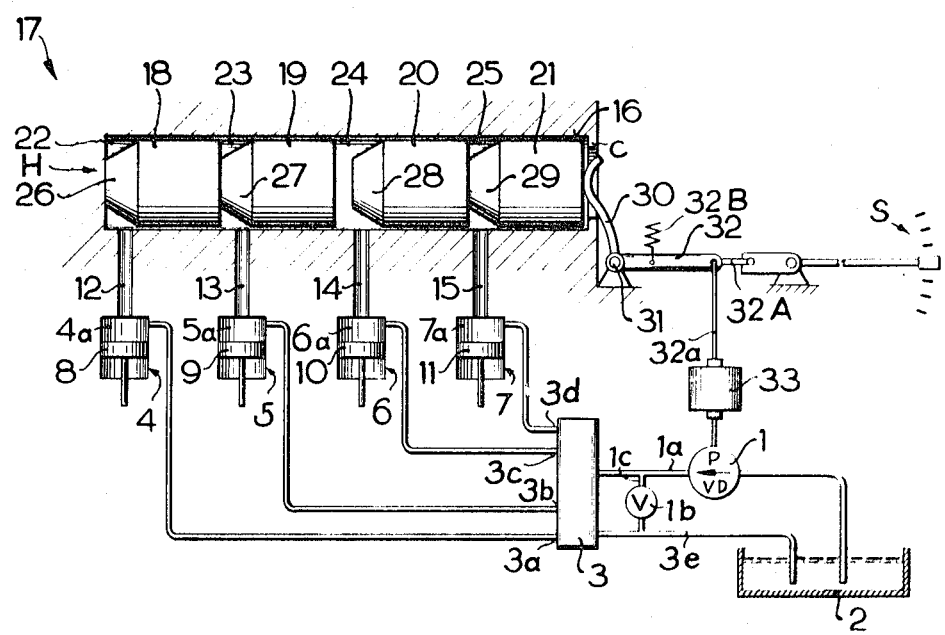
FIG. 1 is a schematic partly elevational and partly sectional view of a hydraulic system including a control assembly which embodies one form of the invention.

FIG. 1 illustrates a hydraulic system which includes a source of hydraulic fluid here shown as a reservoir or tank 2, an adjustable pump 1 serving as a means for pressurizing the fluid which is drawn from the reservoir 2 and for conveying such fluid through a conduit 1a to a distributor valve 3 of any known design. The latter has outlets 3a, 3b, 3c, 3d each of which is connected with one of four consuming units here shown as hydraulic cylinders 4, 5, 6, 7 respectively having reciprocable pistons 8, 9, 10, 11. Those chambers (4a–7a) of the cylinders 4–7 which respectively communicate with the outlets 3a–3d are connected with the inlets 12, 13, 14, 15 of a housing H which forms part of a control assembly or pressure-transmitting assembly 17 and defines an elongated cylindrical chamber 16 accommodating four coaxial control members or plungers 18, 19, 20, 21. The axial length of the chamber 16 exceeds the combined length of the plungers 18–21 and the cylindrical portion of each of these plungers is sealingly but slidably accommodated in the housing H. The left-hand end portions 26, 27, 28, 29 of the plungers 18–21 are of frustoconical shape so that they define with the housing H a series of four axially spaced compartments 22, 23, 24, 25 each of which communicates with one of the inlets 12–15.

The structure of FIG. 1 further comprises a first adjustable output device 33 which in the illustrated embodiment serves as a means for regulating the operation of the pump 1. This output device may be of mechanical, hydraulic, pneumatic or electric type and is adjusted by an operative connection which includes a two-armed lever fulcrumed at 31 and having arms 30, 32. The arm 30 is biased against the right-hand end face of the rightmost plunger 21 by a spring 32B and the arm 32 is mechanically connected with the output device 33 by a linkage 32a. A check valve 1b is provided in a conduit 1c which connects the conduit 1a with a return line 3e serving to convey surplus fluid from the distributor valve 3 to the reservoir 2. The check valve 1b opens automatically when the pressure of fluid in the conduit 1a exceeds a predetermined permissible value. EAch of the cylinders 4–7 constitutes a source of pressurized fluid, i.e., each constitutes means for admitting pressurized fluid into the corresponding inlet (12, 13, 14 or 15) of the housing H. The chamber 16 is a blind bore which is machined into the housing H and whose open end is preferably provided with an inwardly extending collar C to prevent expulsion of the rightmost plunger 21. The spring 32B is strong enough to hold the plunger 21 away from the shoulder C, even when the pressure in one of the compartments 22–25 rises to a predetermined maximum value.

It is assumed that the fluid in the chambers 4a–7a of the cylinders 4–7 is not maintained at the same pressure; for example, that the pressure of fluid in the chamber 6a of cylinder 6, in the inlet 14 and in the compartment 24 exceeds the fluid pressure in the compartments 22, 23, and 25. Consequently, the fluid shifts the plungers 18, 19 in a direction to the left and the plungers 20, 21 in a direction to the right to thereby increase the volume of the compartment 24 and to effect a pivotal movement of the arm 30 whereby the extent of such pivotal movement against the opposition of the spring 32B is a function of the pressure in compartment 24. The arm 32 adjusts the output device 33 by way of the linkage 32a and the device 33 adjusts the pump 1 accordingly. Of course, if the pressure in the compartment 24 is less than the pressure in the compartment 22, 23 or 25, the rightmost plunger 21 again effects a pivotal movement of the lever to the extent which is indicative of the maximum fluid pressure in the chamber 16, i.e., of fluid pressure in one of the inlets 12–15. The angular position of the arm 30 is indicative of the positions of plungers 18–21 with reference to each other and with reference to the housing H.

It is clear that the lever including the arms 30, 32 may also serve as an adjusting means for an electrical output device, for example, a multiposition switch S which is shown in FIG. 1. The extension 32A of the arm 32 then serves as a means for pivoting the movable contact which moves into engagement with one of several fixed contacts of the switch S. It is further clear that the arm 32 (or a part which receives motion from the arm 32) can serve as an index or pointer which moves with reference to a scale to merely indicate the maximum fluid pressure in the housing H. The index and the scale then constitute an output device which is adjustable as a function of fluid pressure in one of the compartments 22–25, namely, as a function of pressure in that compartment wherein the fluid pressure is highest.

Figure 2:
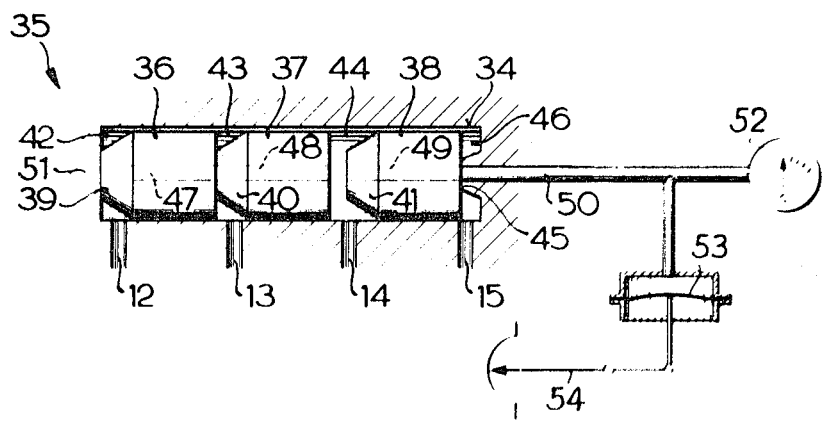
FIG. 2 is a partly elevational and partly sectional view of a modified control assembly.

The control assembly 35 of FIG. 2 comprises a housing 51 having a preferably cylindrical chamber 34 for three coaxial plungers 36, 37, 38 which define with the housing 51 a series of four axially spaced compartments 42, 43, 44, 46. The plungers 36, 37 38 are respectively provided with aligned axially extending bores or passages 47, 48, 49 which communicate with a conduit 50 of the housing 51. The compartments 42, 43, 44, 46 are respectively connected with the inlets 12, 13, 14, 15 of four consuming units (not shown) which correspond to the units 4–7 of FIG. 1. The housing 51 defines an annular stop 45 which can abut against the right-hand end face of the nearest plunger 46. It will be noted that the number of plungers is $n-1$, wherein $n$ is the number of compartments in the housing 51. The frustoconical end portions of the plungers 36, 37, 38 are respectively shown at 39, 40 and 41. The conduit 50 conveys pressurized fluid to a pressure gage 52 and/or to a diaphragm 53 which can move the slider 54 of a potentiometer. The parts 52, 54 are functional equivalents of the adjustable output device 33 or switch S shown in FIG. 1, i.e., each thereof can be adjusted in dependency on fluid pressure in the conduit 50. The diaphragm 53 constitutes or forms part of an operative connection between the housing 51 and the potentiometer.

When the fluid pressure in the chamber 6a of the consuming unit 6 exceeds the fluid pressure in chambers 4a, 5a, 7a of the units 4, 5 and 7, the pressure in compartment 44 rises with the result that the plunger 38 abuts against the stop 45 and seals the conduit 50 from the compartment 46 and inlet 15, and that the plungers 36, 37 seal the conduit 50 from the compartments 42, 43 in a manner clearly shown in FIG. 2. The frustoconical portion 39 abuts against the housing 51 and thus seals the passage 47 from the inlet 12 and compartment 42. The frustoconical portion 40 of the plunger 37 abuts against the right-hand end face of the plunger 36 and seals the passage 48 from the inlet 13 and compartment 43. The conduit 50 communicates with the inlet 14 and with the compartment 44 so that the gage 52 indicates the pressure in the chamber 6a of the consuming unit 6 and the slider 54 assumes a position which is also a function of fluid pressure in the chamber 6a. The fact that the passages 47, 48, 49 are in permanent communication with each other and with the conduit 50 is of no consequence because the frustoconical and/or cylindrical portions of the plungers invariably seal from the conduit 50 all but one of the compartments 42, 43, 44 and 46.

An advantage of the control assembly 35 is that it occupies less room than the control assembly 17 because the number of its plungers is less than the number of compartments. It is clear that the conduit 50 can serve to admit fluid for the purpose of actuating the adjustable regulator 33 or switch S of FIG. 1 or any other output device which must be adjusted as a function of fluid pressure in that consuming unit wherein the pressure of fluid exceeds the fluid pressure in the other unit or units.

An advantage which is common to the control assemblies 17 and 35 is that the direction in which the maximum fluid pressure is communicated to the illustrated output device or devices is always the same. Thus, the plunger 21 always moves in a direction to the right to turn the arm 30 in a clockwise direction and the direction in which the fluid in the conduit 50 acts to influence the position of the diaphragm 53, the index of the gage 52 and/or the slider 54 is also the same. Of course, at least one of the three output devices shown in FIG. 2 can be actuated by fluid in a second conduit (not shown) which can be provided in the left-hand wall of the housing 51 in registry with the bore 47 of the leftmost plunger 36.

It is clear that the number of plungers need not exceed one; for example, the control device 35 of FIG. 2 can comprise a single plunger (e.g., 38) if the apparatus comprises only two consuming units (10 and 11).

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a fluid-operated system wherein a plurality of fluid-operated units are actuated by fluid at variable pressures and wherein at least one output device is influenced as a function of the fluid pressure in one of said units, a combination comprising a pressure-transmitting assembly having housing means provided with a chamber; pressure-transmitting means including at least one plunger movably accommodated in said chamber and defining with said housing means a plurality of compartments each of which is in permanent communication with a respective one of said units so that the position of said pressure-transmitting means in said chamber is a function of fluid pressure in that unit wherein the fluid pressure is highest; and an operative connection provided between one of said means and said output device and operative to adjust the latter as a function of the position of said pressure-transmitting means.

2. A combination as defined in claim 1, wherein said pressure-transmitting means comprises a plurality of plungers movable relative to each other and having portions sealingly received in said housing means, said housing means having a closed and an open end, said plungers including a first plunger which is located at said open end and adjacent to a single compartment and a second plunger disposed between two compartments.

3. A combination as defined in claim 2, wherein said operative connection comprises a movable element which receives motion from said first plunger.

4. A combination as defined in claim 1, wherein the number of said compartments equals $n+1$, wherein said pressure transmitting means comprises $n$ plungers each reciprocably and sealingly received in said chamber, wherein $n$ is a whole number including one, and wherein said operative connection includes conduit means communicating with said chamber, said pressure-transmitting means being arranged to establish communication between said conduit means and that compartment wherein the fluid pressure is highest.

5. A combination as defined in claim 4, wherein said pressure-transmitting means comprises at least two plungers and wherein each of said plungers is provided with a passage in permanent communication with said conduit means, each of said plungers being located between two of said compartments.

6. A combination as defined in claim 5, wherein said housing means comprises stop means adjacent to one of said plungers and operative to seal one of said compartments from the passage of said one plunger and from said conduit means in a first position of said one plunger, said one plunger moving when the fluid pressure in said one compartment is highest to a second position in which it abuts against another plunger whereby said other plunger seals another compartment from the passage of said one plunger and from said conduit means.

7. A combination as defined in claim 1, wherein said pressure-transmitting means comprises a plurality of plungers reciprocably received in said chamber, each of said plungers having a first portion which is sealingly received in said housing means and a second portion which defines with said housing means one of said compartments.

8. A combination as defined in claim 1, wherein the output device is an electrical device and said operative connection comprises a movable element which is arranged to change the condition of said electrical device in response to changes in the position of said pressure-transmitting means.

9. A combination as defined in claim 1, wherein said chamber is cylindrical and said pressure-transmitting means comprises a plurality of coaxial plungers each having a cylindrical portion sealingly and reciprocably received in said chamber and a frustoconical portion which is adjacent to one of said compartments.

10. A combination as defined in claim 1, wherein said pressure-transmitting means comprises a plurality of discrete coaxial plungers sealingly and reciprocably received in said chamber, said housing means having a plurality of inlets each communicating with one of said compartments and with the respective fluid-operated unit and at least one of said plungers being disposed between two of said compartments.

11. A combination as defined in claim 1, wherein the direction of adjustment of said output device is the same irrespective of in which of said units the fluid pressure is highest.

12. A combination as defined in claim 1, said at least one plunger being located between two of said compartments and having a passage, said operative connection including conduit means communicating with said chamber and said passage being arranged to establish communication between said conduit means and that compartment wherein the fluid pressure is highest.